United States Patent
Schwuger et al.

(12) 
(10) Patent No.: US 6,547,052 B1
(45) Date of Patent: Apr. 15, 2003

(54) SYNCHRONIZING RING WHICH IS SHAPED WITHOUT CUTTING

(75) Inventors: Josef Schwuger, Hochstadt (DE); Rudolf Sinner, Bubenreuth (DE); Hartwig Waldert, Aisch (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/856,437

(22) PCT Filed: Oct. 27, 1999

(86) PCT No.: PCT/EP99/08119

§ 371 (c)(1), (2), (4) Date: May 30, 2001

(87) PCT Pub. No.: WO00/31428

PCT Pub. Date: Jun. 2, 2000

(30) Foreign Application Priority Data

Nov. 23, 1998 (DE) .......................... 198 53 856

(51) Int. Cl.[7] .............................. F16D 23/02
(52) U.S. Cl. ............. 192/53.34; 192/66.2; 192/107 R; 74/339
(58) Field of Search .................. 192/53, 34, 53.3, 192/53.1, 66.2, 107 R; 74/339

(56) References Cited

U.S. PATENT DOCUMENTS

| | | | |
|---|---|---|---|
| 4,698,889 A | 10/1987 | Patzer et al. | |
| 4,886,831 A | * 12/1989 | Morcos et al. | 514/2 |
| 5,788,036 A | * 8/1998 | Soffa et al. | 192/110 R |

FOREIGN PATENT DOCUMENTS

| | | |
|---|---|---|
| DE | 3225364 | 1/1984 |
| DE | 3519810 | 12/1986 |
| DE | 3712411 | 10/1987 |
| DE | 19718905 | 11/1998 |
| EP | 0159080 | 10/1985 |

* cited by examiner

*Primary Examiner*—Saul Rodriguez
(74) *Attorney, Agent, or Firm*—Bierman, Muserlian and Lucas

(57) ABSTRACT

A synchronizing ring (1, 8, 13) having a substantially cone-shaped annular body (2, 10, 14, 21) is made by shaping out of sheet metal and is provided on its end section (2b) having the small cone-diameter, with stops (5, 6, 7) that extend in radial direction beyond the contour of the outer peripheral surface of the annular body (2, 10, 12, 14).

3 Claims, 4 Drawing Sheets

SYNCHRONIZING RING WHICH IS SHAPED WITHOUT CUTTING

FIELD OF THE INVENTION

The invention concerns a synchronizing ring of a synchronizing device comprising:

an annular body, a gearing and at least one stop, the annular body is made of sheet metal and is cone-shaped, the annular body is delimited by a first end section and a second end section, the first end section having the largest cone-diameter of the cone-shaped annular body and the second end section having the smallest cone-diameter of the cone-shaped annular body, the annular body comprising on its inner peripheral surface, a friction surface, the gearing extends from the first end section of the annular body and projects beyond the outer peripheral surface of the annular body, and the stop is formed integrally on the annular body while being arranged on the outer peripheral surface of the annular body.

BACKGROUND OF THE INVENTION

Synchronizing rings of the pre-cited type, also called outer synchronizing rings, are generally connected to the synchronizing body of a synchronizing device directly or indirectly by positive engagement. This connection is effected by stops formed on the outer synchronizing ring. As a rule, these stops extend from the ends of the synchronizing ring and are often configured as tabs. Restrictions are imposed on their configuration and orientation by the inherent characteristics of shaping techniques. In these synchronizing rings, the radially outward oriented elements like gearings, tabs or axial stops are situated on the edge with the large cone-diameter. The synchronizing rings are mostly drawn from blanks into cups having a conical outer shape, or are stamped into their conical shape from pre-punched annular blanks. The large cone-diameter is situated on the upper edge of the cup, which edge has a radially outward oriented collar. The small cone-diameter forms the bottom region of the cup. The locking gear and the other aforesaid elements are frequently worked out of the collar. It is also possible to punch or for tabs out of the bottom region. But these can only be oriented inwards in radial direction or axially in the direction of removal from the die because, otherwise, they hinder a smooth removal therefrom.

It is required of modern synchronizing devices that they have a low weight and a small design space requirement. Theoretically, the width of a synchronizing device is only determined by the width of the friction surfaces required for the friction performance. In practice, however, the space required for the elements which effect the positive engagement of the rings with their connecting structures, like the aforesaid tabs, must also be taken into consideration. The axial dimension of a synchronizing device is substantially influenced by the configuration and orientation of such tabs. In the prior art, radially inward extending tabs, and particularly those oriented in axial direction, disadvantageously affect the total width of the synchronizing ring. This means that, in addition to the space required for the friction surfaces, extra space is needed for the stops and their engagement into elements of the connecting structure.

The generic structure of an outer synchronizing ring is described in DE 35 19 811 C2. The width of this ring is determined only by the width of its friction surface. The positive engagement with ambient structures is effected through stops that are formed in the region of the outer crown gear. The stops are formed by tabs that by bending of tongues are oriented in the same direction as the surface of the annular body. The tabs start from the end of the ring having the larger diameter of the cone-shaped ring and their free ends point toward the end of the ring that has the small cone-diameter. During the manufacturing process, these tabs are punched out together with the gearing from the edge of the cup after this has been drawn, and are subsequently bent. If the end with the small cone-diameter points toward the synchronizing ring, positive connections to the synchronizing body can only be realized in such synchronizing rings in a more complex and expensive manner, for example, by providing longer tabs. The longer a tab is, the more difficult it is to position and orient it in an exact manner. The manufacturing work and thus also the manufacturing costs are increased, for example, due to additional calibration.

SUMMARY OF THE INVENTION

It is therefore an object of the invention to provide a synchronizing ring which avoids the aforesaid drawbacks and whose width is substantially determined only by the required width of its friction surface.

This object is achieved according to the characterizing part of claim 1 in that the stop is arranged on or near the end section of the annular body having the small cone-diameter, and the contour of the stop extends in radial direction beyond the contour of the outer peripheral surface of the annular body. The stops are preferably arranged on the end of the outer synchronizing ring on which the small diameter of its conical annular body is formed. Starting substantially from the end, these stops protrude in radial direction beyond the outer contour of the annular body. No additional space is therefore required in axial direction in excess of the width of the annular body with its friction surface. Since the stops are already arranged on the end of the synchronizing ring facing the synchronizing body, they can be very short and compact. Their shape and position can be very precisely realized. Their manufacturing can be integrated in the shaping process of the synchronizing ring, or can follow this. It is possible to execute and configure the stops in many different forms.

In a preferred embodiment, the stop is formed by a radially outward oriented tab that extends radially from the end of the annular body. The tab can be made during the fabrication of the synchronizing ring, for example, from the material of the bottom of the drawn cup by stamping and folding it over radially outwards. The material has to be likewise shaped radially outwards even if the tab is made in the blank before this is shaped and the blank is then stamped to form the synchronizing ring with a conical cross-section, or if the synchronizing ring is made from a tubular section. It is also conceivable to form the tabs by radially outward bordering.

According to a further feature of the invention, the stop may also be formed by a tab that is worked at least partly out of the wall of the annular body and then stamped radially outwards. In the region of the annular body, therefore, free cuts or recesses must be provided on the left and right of the material required for making the tabs. This can be of advantage if a stop is required that does not have to be absolutely flush with the end of the annular body in axial direction. Besides this, a recess is created in this way which additionally serves entrainment and guidance purposes for the engagement of connecting elements, for example thrust members, with the synchronizing body.

Additional free cuts on the left and right of the junction of a tab with the annular body are also required for avoiding stress peaks which can result from notch effects under loading.

Larger stop and guide surfaces are created on a stop if, as described in a further preferred embodiment of the invention, the tab comprises on its free end a folded edge oriented towards the gearing. This folded edge may be bent at a slant or at right angles to the tab and points towards the gearing. In this way, enlarged lateral contact surfaces are formed on the stop for contact with the synchronizing body which lead to a reduction of the contact pressure between the stop and the synchronizing body on abrupt entrainment of the synchronizing ring by the synchronizing body.

In an advantageous embodiment of the invention, the sides of the tabs facing away from the gearing form an axial stop surface. This axial stop surface is preferably perpendicular to the central longitudinal axis of the synchronizing ring and extends from the inner diameter of the annular body to the outer edge of the tab. It is also conceivable to have the stop surface extend at an acute or an obtuse angle to the central longitudinal axis of the synchronizing ring.

Further stops according to the invention are preferably made by stamping or shaping of the annular body. Thus, in a preferred embodiment, a stamping is made on the end of the annular body having the small cone-diameter. During stamping, material is displaced out of the wall of the annular body to beyond the outer radial contour for simultaneously forming an axial stop surface preferably extending at a right angle to the central longitudinal axis of the synchronizing ring. In one variant, the stamping is effected on the entire wall cross-section. If it is desired, for example, to keep the shaping forcing low, the stamping is worked out of the surface of the annular body. In this case, a portion of a wall subsists between the inner peripheral surface and the stamping and can be used as a guide element, or it serves to assure that the friction surface configured on the inner surface of the synchronizing ring is not interrupted.

A further advantageous embodiment of a stop according to the invention comprises making the stop by a bead-like formation. This forms on the outer peripheral surface of the annular body, a contour protruding beyond the wall, and on the inner peripheral surface, a groove oriented along the central longitudinal axis of the synchronizing body. The stop surface itself is formed on the end of the formation on its side facing away from gearing of the synchronizing ring. It is of advantage that the groove formed by the formation can serve as an oil groove of the synchronizing ring.

In a further preferred embodiment, stops in the form of tabs are cut free from the wall of the annular body and are bent slightly radially outwards. These tabs are bent outward only so far that their free end forms a stop. That portion of an end surface of the free end that protrudes beyond the contour of the outer peripheral surface of the annular body forms the axial stop surface.

BRIEF DESCRIPTION OF THE DRAWINGS

The invention will now be described more closely with reference to several examples of embodiment.

DETAILED DESCRIPTION OF THE DRAWINGS

Figure 1:
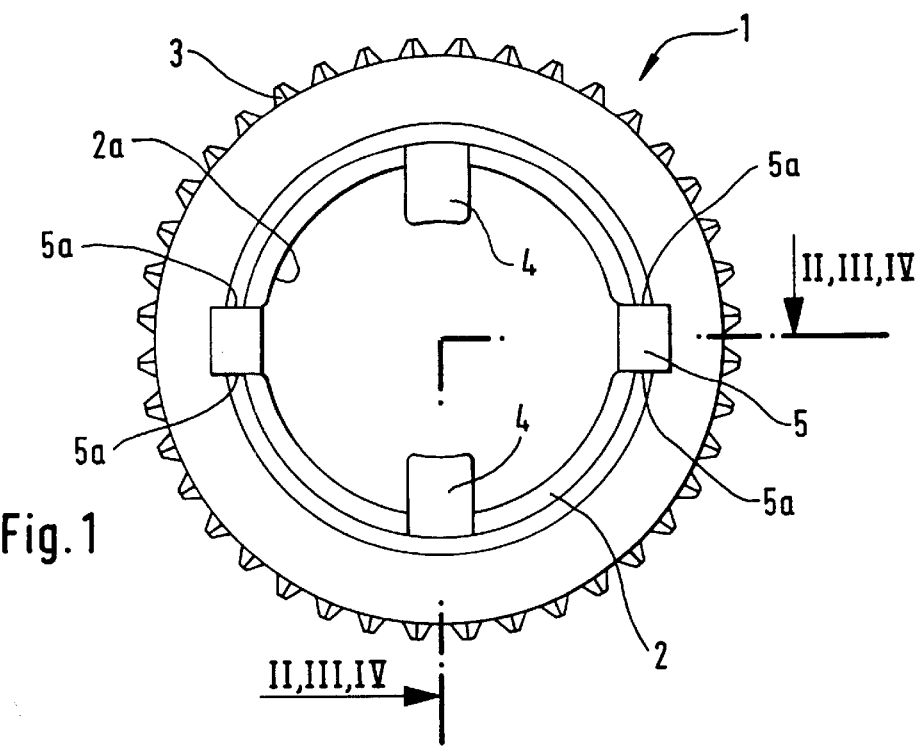
FIG. 1 shows an example of embodiment of an outer synchronizing ring according to the invention having radially outwards extending tabs.
Figure 2:
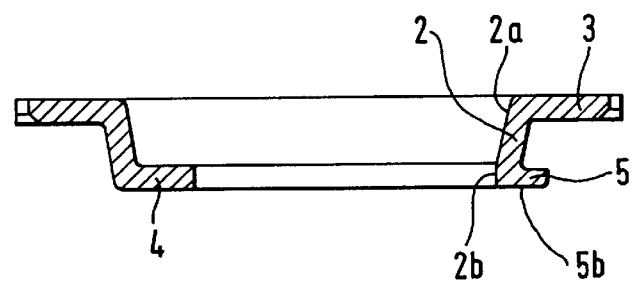
FIG. 2 is a longitudinal section through the synchronizing ring of FIG. 1 along line II, III, IV–II, III, IV.

FIG. 1 shows an example of embodiment of an outer synchronizing ring 1 configured according to the invention. A gearing 3, in the present case in the form of a crown gear, is configured on the annular body 2 in the region of the first end section 2a of the outer synchronizing ring 1. Two inwardly oriented driver lugs 4 for positive engagement, e.g. with an inner synchronizing ring, not shown, extend from the annular body 2. From the edge region of the second end section 2b of the annular body 2, two tabs 5 extend radially outwards and form lateral stop surfaces 5a. As can be seen in FIG. 2, on its end facing away from the gearing 3, the tab 5 further forms a flat axial stop surface 5b.

Figure 3:
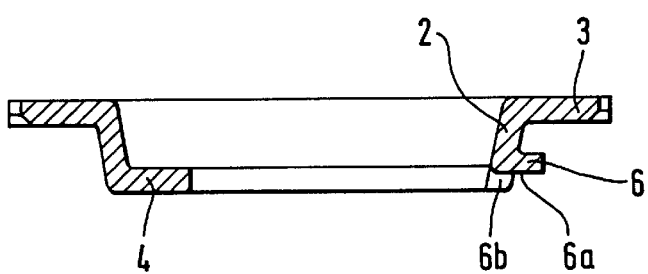
FIG. 3 is a longitudinal section through the synchronizing ring of FIG. 1 along line II, III, IV–II, III, IV showing an alternative to the configuration shown in the sectional view of FIG. 2.
Figure 4:
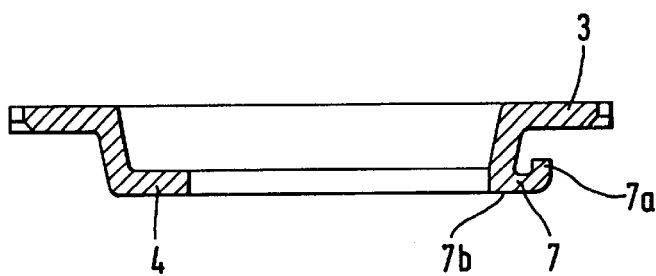
FIG. 4 is a longitudinal section through the synchronizing ring of FIG. 1 along line II, III, IV–II, III, IV showing another alternative to the configuration shown in the sectional view of FIG. 2.

A further example of embodiment of a tab is shown in FIG. 3. The tab 6 is worked partly out of the material of the annular body 2 and forms an axial stop surface 6a. A recess 6b extends from the stop surface 6a to the end face of the annular body 2. This recess 6b is formed due to the tab 6 being worked out of the annular body 2 at this point. A further alternative configuration of a tab is represented in FIG. 4. The tab 7 comprises a right-angled fold 7a which is oriented towards the gearing 3, the tab further forming on its side facing away from the gearing, an axial stop surface 7b.

Figure 5:
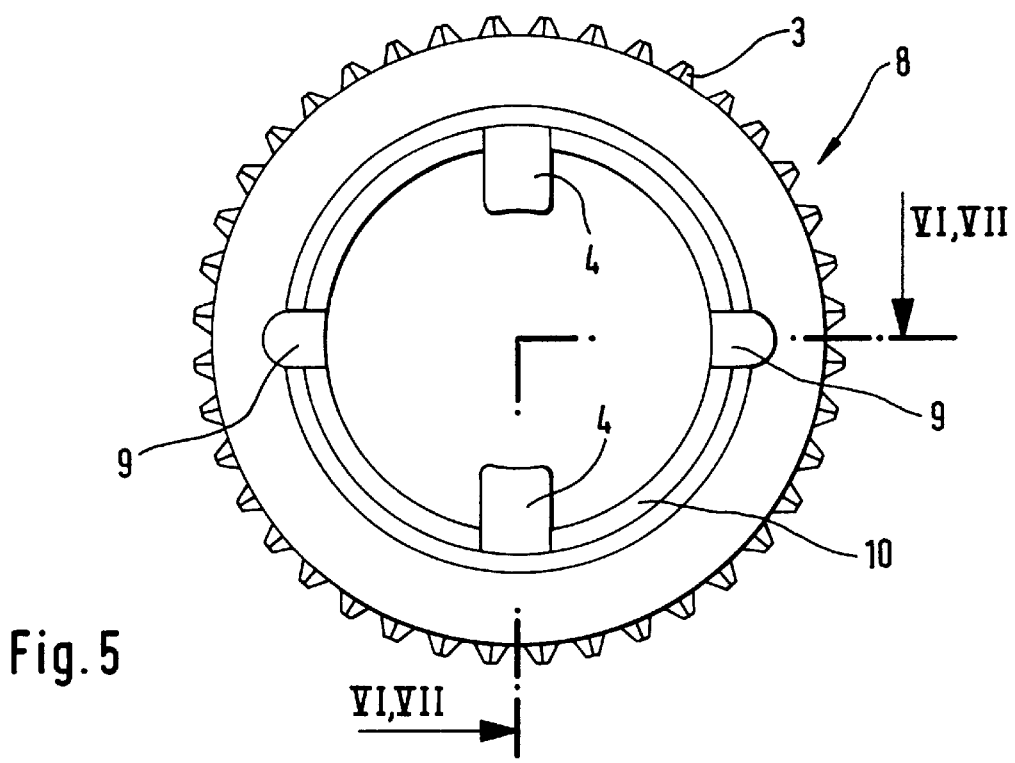
FIG. 5 shows an example of embodiment of an outer synchronizing ring according to the invention, having stampings made on an end thereof.
Figure 6:
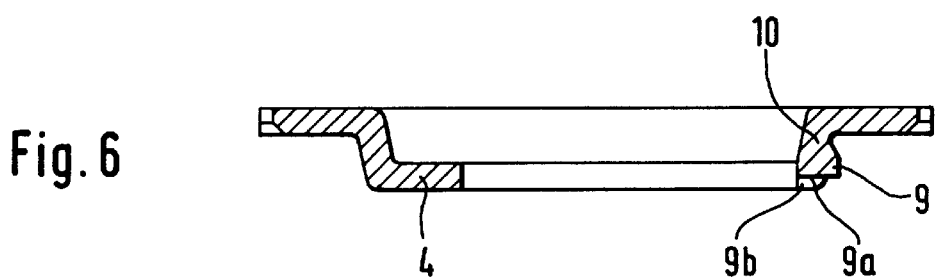
FIG. 6 is a longitudinal section through the synchronizing ring of FIG. 5 along line VI, VII–VI, VII.
Figure 7:
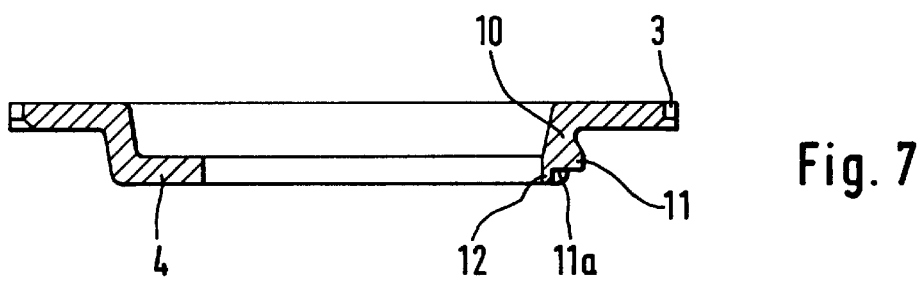
FIG. 7 is a longitudinal section through the synchronizing ring of FIG. 5 along line VI, VII–VI, VII showing an alternative to the configuration shown in FIG. 6.

FIG. 5 illustrates an outer synchronizing ring 8 having stops 9 made by stamping on an end of the annular body 10. As can be seen in FIG. 6 which is a sectional representation of the synchronizing body of FIG. 5, the stop 9 is formed by material that is displaced out of the wall of the annular body 10 and heaped up outwards. Starting from the end, a recess 9b is formed in the region from which the material was displaced. An axial stop surface 9a extending at a right angle to the central longitudinal axis of the synchronizing ring is formed adjacent the recess 9b on the stop 9. A stop having an alternative configuration is represented in FIG. 7. In contrast to the stop 9 of FIG. 6 whose axial stop surface 9a extends uninterrupted outwards from the inner peripheral surface of the outer synchronizing ring 8, the stop 11 of FIG.

7 is formed by a displacement of material from the surface of the annular body 10. A part of the wall subsists after stamping so that the inner peripheral surface of the outer synchronizing ring 8 is not interrupted. The subsisting part of the wall forms a shoulder 12 from which an axial stop surface 11a extends radially outwards at a right angle to the central longitudinal axis of the outer synchronizing ring 8.

Figure 8:
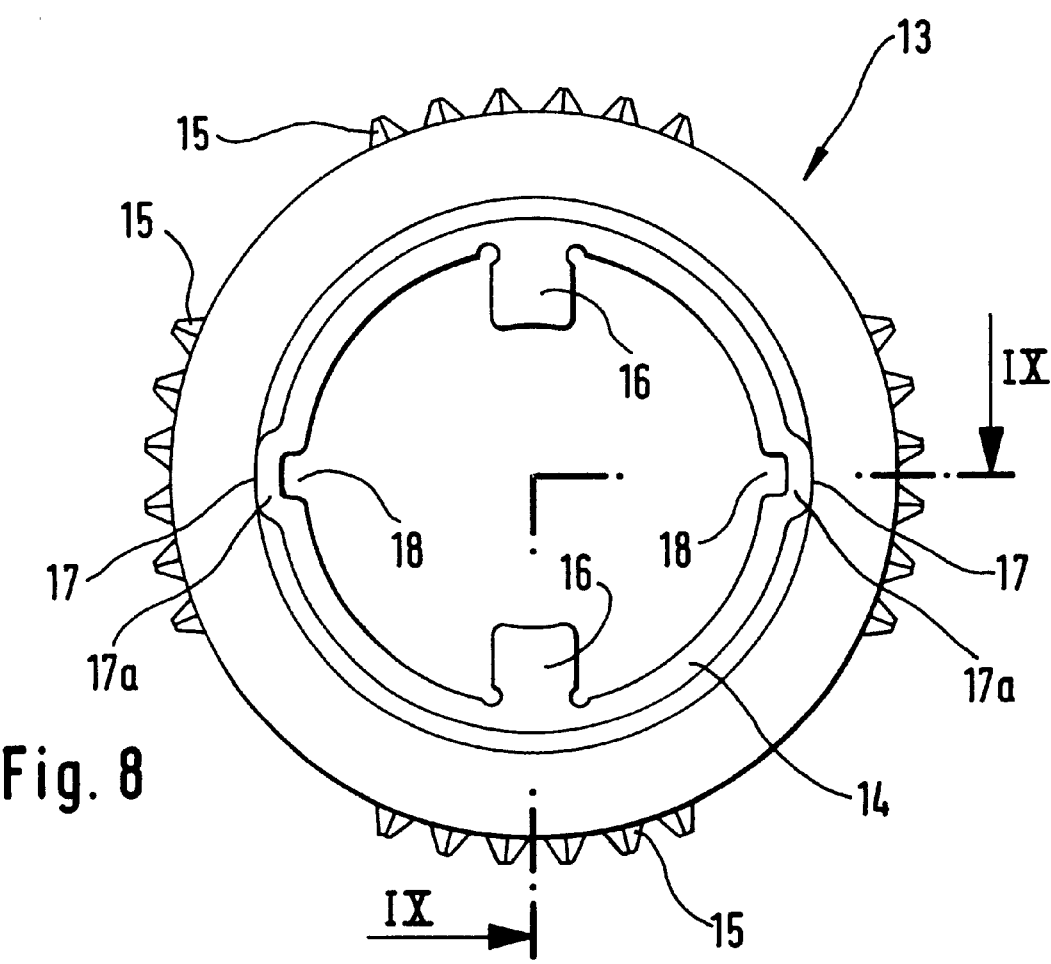
FIG. 8 shows a further example of embodiment of an outer synchronizing ring according to the invention, having a bead-like formation as a stop.
Figure 9:
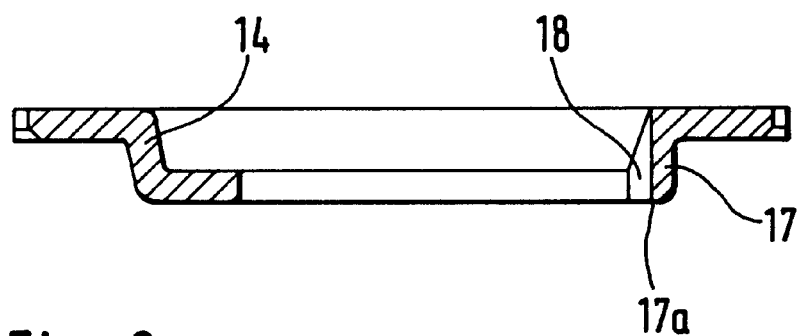
FIG. 9 is a longitudinal section through the synchronizing body of FIG. 8 along line IX.

A further alternative configuration of an outer synchronizing ring of the invention is illustrated in FIG. 8. A gearing 15 is arranged in sections on the annular body 14 of an outer synchronizing ring 13. The annular body 14 further comprises, for example, two inwards oriented driver lugs 16. At two opposing points, the wall of the annular body 14 is shaped radially outwards to form stops 17 at these points, and grooves 18 which extend in the inner peripheral surface. The stop surface 17a of the stop 17, as can also be seen in FIG. 9, is configured on the end of the annular body 14.

Figure 10:
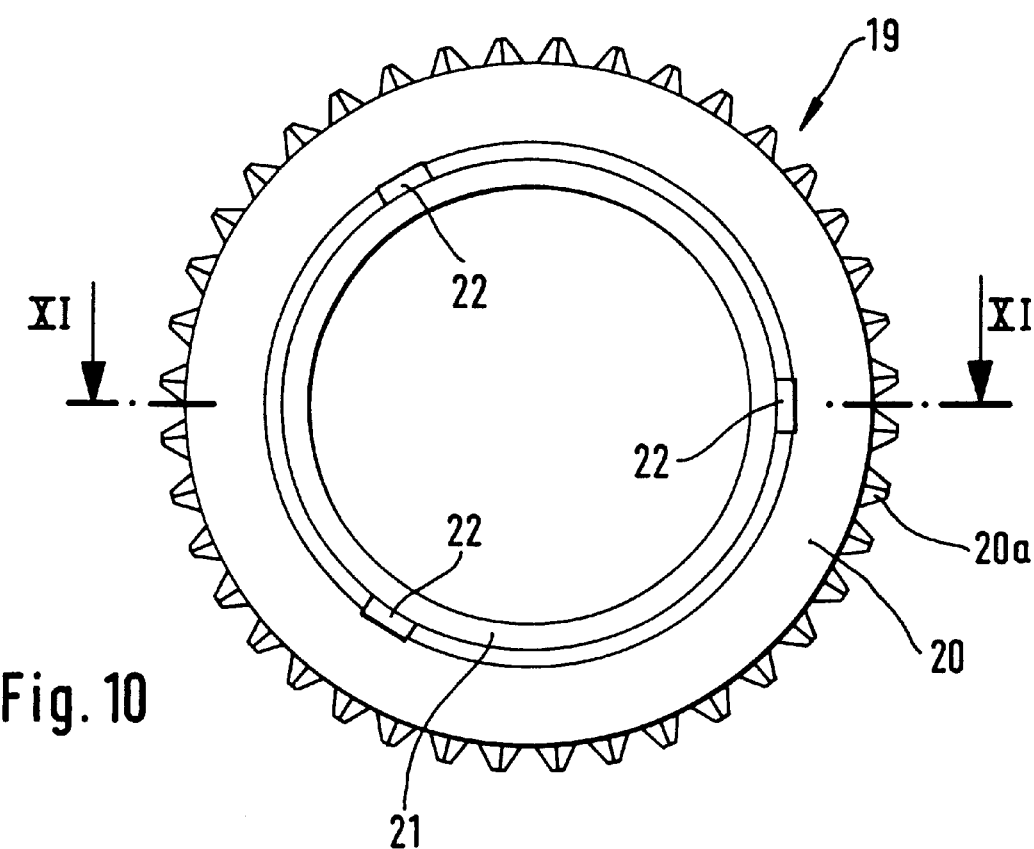
FIG. 10 shows a further example of a synchronizing ring according to the invention, having a stop lug worked out of the annular body and extending parallel to the central longitudinal axis of the annular body.
Figure 11:
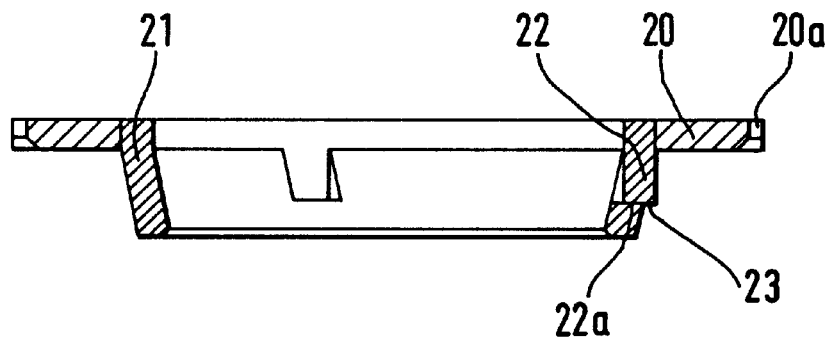
FIG. 11 is a longitudinal section through the synchronizing ring of FIG. 10 along line XI.

FIGS. 10 and 11 show a synchronizing ring 19 that comprises a ring 20 having a gearing 20a and an annular body 21. Three stops 22 spaced at 120° from one another are formed on the annular body 21. These stops 22 are cut free from the wall of the annular body 21 and bent slightly from the inside to the outside only so far as to extend in longitudinal direction parallel to the central longitudinal axis of the annular body 21. The outer surface 22a of the free end of the stop 22 is partly overlapped by the wall of the annular body 21. The portion of the outer surface 22a protruding beyond the contour of the outer peripheral surface forms the stop surface 23.

Reference numerals

1 Outer synchronizing ring
2 Annular body
2a First end section
2b Second end section
3 Gearing
4 Driver lug
5 Tab
5a Lateral stop surface
5b Axial stop surface
6 Tab
6a Axial stop surface
6b Recess
7 Tab
7a Right-angled fold
7b Axial stop surface
8 Outer synchronizing ring
9 Stop
9a Axial stop surface
9b Recess
10 Annular body
11 Stop
11a Axial stop surface
12 Shoulder
13 Outer synchronizing ring
14 Annular body
15 Gearing
16 Driver lug
17 Stop
17a Stop surface
18 Groove
19 Synchronizing ring
20 Ring
20a Gearing
21 Annular body
22 Stop
22a Outer surface
23 Stop surface

What is claimed is:

1. A synchronizing ring (1) of a synchronizing device comprising:
    an annular body (2), a gearing (3) and at least one stop,
    the annular body (2) is made of sheet metal and is cone-shaped,
    the annular body (2) is delimited by a first end section (2a) and a second end section (2b), the first end section (2a) having the largest cone-diameter of the cone-shaped annular body (2) and the second end section (2b) having the smallest cone-diameter of the cone-shaped annular body (2),
    the annular body (2) comprising on its inner peripheral surface, a friction surface,
    the gearing (3) extends from the first end section (2a) of the annular body (2) and projects beyond the outer peripheral surface of the annular body (2), and
    the stop is formed integrally on the annular body (2) while being arranged on the outer peripheral surface of the annular body (2) and projecting radially outwards beyond the outer peripheral surface of the annular body (2),
    characterized in that the stop is formed by a radially outward oriented tab (5, 6, 7), said tab (5, 6, 7) is arranged on the second end section (2b) of the annular body (2) and is bent outwards from the second end section of the body (2) and said tab (5, 7) is extending radially from the second end section (2b) of the annular body (2).

2. A synchronizing ring according to claim 1, characterized in that the tab (7) comprises on its free end, a folded edge (7a) oriented towards the gearing (3).

3. A synchroinzing ring according to claim 1, characterized in that the tab (5, 6, 7), comprises on its side facing away from the gearing (3), a flat axial stop surface (5b, 6a, 7b)
    that is perpendicular to the central longitudinal axis of the synchronizing ring (1)
    and extends outwards starting from the edge region of the inner peripheral surface adjoining the end face of the annular body (2).

* * * * *